(12) United States Patent
Meder

(10) Patent No.: US 6,837,422 B1
(45) Date of Patent: Jan. 4, 2005

(54) SERVICE UNIT FOR AN X-RAY EXAMINING DEVICE

(75) Inventor: Claus Meder, Rossdorf (DE)

(73) Assignee: Heimann Systems GmbH, Wiesbaden (DE)

( * ) Notice: Subject to any disclaimer, the term of this patent is extended or adjusted under 35 U.S.C. 154(b) by 101 days.

(21) Appl. No.: 09/654,066

(22) Filed: Sep. 1, 2000

(51) Int. Cl.$^7$ .............................................. G06F 17/00
(52) U.S. Cl. ..................... 235/375; 235/382; 235/380; 378/57; 378/210; 340/5.81
(58) Field of Search ................................. 358/302, 1.13; 340/5.1, 5.8, 5.81, 5.82; 378/88, 57, 210, 204, 165; 235/375, 380, 382, 382.5, 462.15; 108/50.01; 705/3; 713/182; 250/586; 600/407, 449, 437

(56) References Cited

U.S. PATENT DOCUMENTS

| | | | | |
|---|---|---|---|---|
| 3,693,166 A | * | 9/1972 | Rawson et al. ............... 710/37 |
| 3,839,708 A | * | 10/1974 | Bredesen et al. .......... 358/1.13 |
| 5,202,550 A | | 4/1993 | Kocznar et al. |
| 5,291,399 A | * | 3/1994 | Chaco ........................... 705/3 |
| 5,367,552 A | * | 11/1994 | Peschmann .................. 378/57 |
| 5,692,029 A | * | 11/1997 | Husseiny et al. ............. 378/88 |
| 5,814,798 A | * | 9/1998 | Zancho ....................... 235/380 |
| 5,836,010 A | * | 11/1998 | Kim ............................. 713/200 |
| 5,865,745 A | * | 2/1999 | Schmitt et al. ............. 600/407 |
| 5,877,483 A | * | 3/1999 | Bilich et al. ................. 235/382 |
| 6,047,257 A | * | 4/2000 | Dewaele ...................... 704/270 |
| 6,070,240 A | * | 5/2000 | Xydis ........................... 713/200 |
| 6,088,450 A | * | 7/2000 | Davis et al. ................. 713/182 |
| 6,094,589 A | * | 7/2000 | Schmitt ....................... 600/407 |
| 6,155,179 A | * | 12/2000 | Aust et al. ................. 108/50.01 |
| 6,234,969 B1 | * | 5/2001 | Chaintreuil et al. ......... 600/449 |
| 6,264,104 B1 | * | 7/2001 | Jenkins et al. .......... 235/380 X |
| 6,394,353 B1 | * | 5/2002 | Schmitt ................. 235/462.15 |
| 6,506,155 B2 | * | 1/2003 | Sluis ........................... 600/437 |
| 6,581,069 B1 | * | 6/2003 | Robinson et al. ......... 707/104.1 |
| 2002/0063226 A1 | * | 5/2002 | Tamakoshi et al. ......... 250/586 |
| 2003/0023592 A1 | * | 1/2003 | Modica et al. .................. 707/6 |
| 2004/0024814 A1 | * | 2/2004 | Takeo et al. ................ 709/203 |
| 2004/0032622 A1 | * | 2/2004 | Tezuka ....................... 358/302 |

FOREIGN PATENT DOCUMENTS

| | | |
|---|---|---|
| DE | 34 36 444 A1 | 4/1986 |
| DE | 196 25 410 A1 | 1/1998 |
| DE | 199 10 615 C1 | 6/2000 |
| EP | 0 393 784 A1 | 10/1990 |
| EP | 0 716 399 A1 | 6/1996 |
| JP | 4-200449 A * | 7/1992 |
| JP | 9-34884 A * | 2/1997 |
| WO | WO 98/12670 A1 | 3/1998 |

* cited by examiner

Primary Examiner—Jared J. Fureman
(74) Attorney, Agent, or Firm—Birch, Stewart, Kolasch & Birch, LLP

(57) ABSTRACT

Disclosed is a uniquely identifiable identification system incorporated into an X-ray testing apparatus or into this system, so that each operator (6) can log onto the operating system only with his or her own individual identification (4, 4.1). The identification (4, 4.1) is read and optionally rewritten by a counterpart device (3, 3.1) of the identification system. Upon leaving the operating system, the operator (6) is automatically logged off by way of removing the identification device (4, 4.1), or by way of exiting from a defined local area (N) around the X-ray testing apparatus, and the operating system is then ready for access by another operator (6).

22 Claims, 1 Drawing Sheet

SERVICE UNIT FOR AN X-RAY EXAMINING DEVICE

BACKGROUND OF THE INVENTION

1. Field of the Invention

The present invention relates to an operator unit for an X-ray examining apparatus of a type including an operating field for operation of an operating system of the X-ray examining apparatus and a monitor for displaying an X-ray image for an operator.

2. Related Art

German Patent 199 10 615 C1 discloses an operator terminal for an X-ray examining apparatus. It is known that such an X-ray examining apparatus is used by multiple operators at regular or irregular intervals.

To identify an individual operator, a digital code is entered via an operator panel into the operating system, which is assigned individually to the respective operator. One disadvantage of this type of input is that different operators can log onto the operating system using the same digital code without the operating system detecting the difference, so that individual statistical data acquisition for each operator could be falsified.

This leads to the object of the present, namely to allow unique identification of an operator in the operating system.

SUMMARY OF THE INVENTION

The present invention is based on the idea of incorporating a unique identification system into an X-ray examining apparatus or system such that each operator can log onto the operating system only with his or her own individual identification means. This identification means is read by a counterpart device of the identification system and if necessary rewritten. For example, the operating system can be cleared for access by another operator by this process. When leaving the operating system, the operator is logged off and the operating system is made accessible for another operator upon removal of the identification means or upon leaving a defined local area around the X-ray examining apparatus. The operating system thus remains ready for operation, preferably only with the help of a functional identification means.

The identification mean may be a means requiring contact, such as a chip card, a magnetic card or the like, in which case the counterpart device of the identification system would be a card reader. In the case of an identification system that operates without contact, e.g., by means of electromagnetic radiation, the identification means is a small transceiver unit or a transponder. The respective counterpart device is therefore adapted to operate with the specific type of identification means used. A contacting or non-contacting identification means, which operates according to inductive principles may also be implemented.

In another advantageous embodiment of the present invention, the identification means is writable. Due to the writability of the identification device, individual statistics and data recorded in, for example, training sessions or in actual practice may be stored. In addition, each operator can program individual instrument settings, such as keyboard management, into his or her identification means, so that an operator can set priority functions on freely allocable keys in an operating field in accordance with individual preference.

Instrument parameters that have been individualized for each operator can also be stored on the identification means. These parameters might include, for example, the brightness of a display screen, color scaling and/or gray scale display properties or ergonomic data.

The counterpart device for the individual identification means is preferably integrated into the operating field.

To prevent the individual identification means from inadvertently remaining in the operating system when the operator leaves the local area or the X-ray examining apparatus itself, the identification means may be attached to the operator mechanically, e.g., by a chain. For example, in the case of a non-contact identification means, a local area would be defined such that the operator would have to remain within this local area for the operating system to remain active. An operator leaving this area would then be automatically logged off the operating system, which would thereby be cleared for use by another operator. In particular, the operating system would go into a stand-by mode.

In addition, the identification means may also be used as an access card for other objects, installations, company areas and the like.

Providing external storage of statistics or personal data on the identification means provides the advantage that the data would remain available in the event of or in spite of a failure of the X-ray examining apparatus. Furthermore, such data may be recorded on multiple items of equipment and stored centrally by way of the identification means.

BRIEF DESCRIPTION OF THE DRAWINGS

The present invention will now be described in greater detail by way of reference to the attached drawings, which illustrate.

DETAILED DESCRIPTION OF THE PREFERRED EMBODIMENTS

Figure 1:
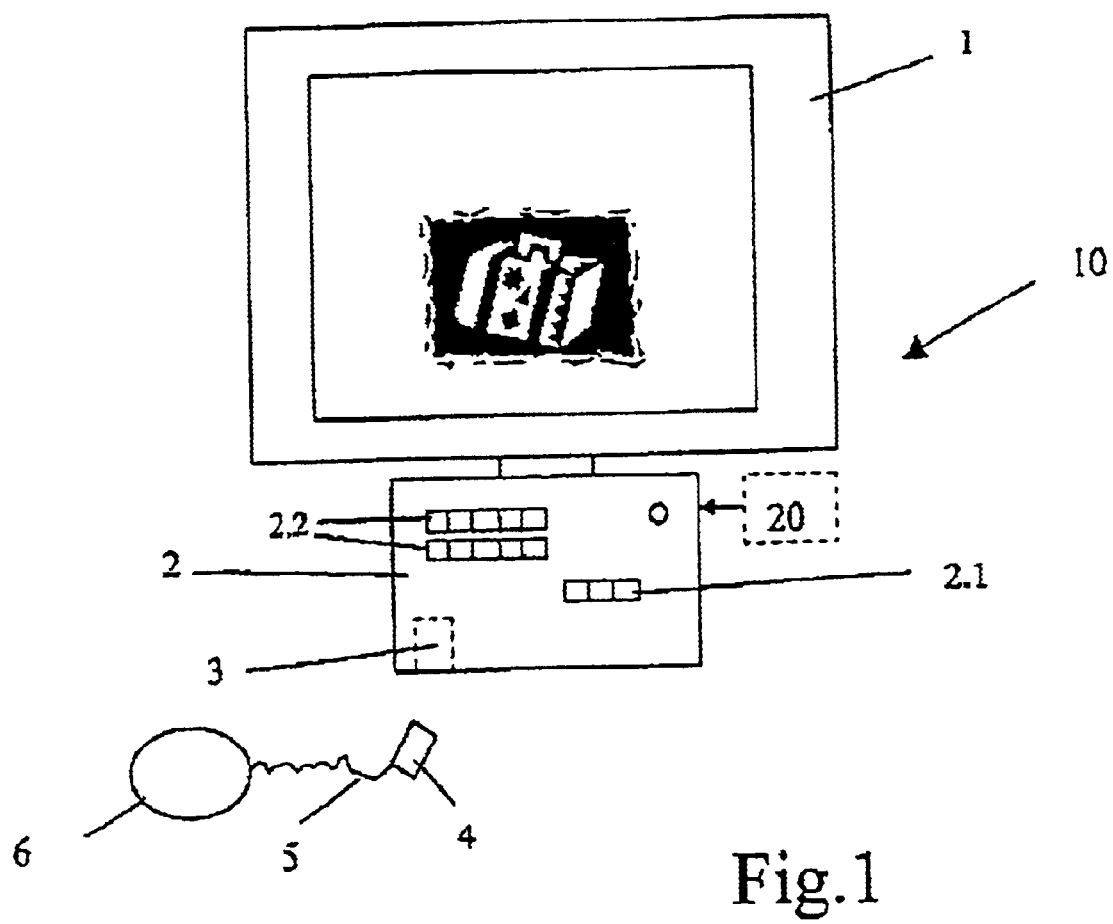
FIG. 1 a monitor and an operating field as the operator unit of an X-ray examining apparatus.

FIG. 1 illustrates a monitor 1 of an X-ray examining apparatus, which is not shown in further detail. An operating field 2, with which an operating system is controlled and by which the X-ray examining apparatus is operated, is connected to the monitor 1 and the operating system of the X-ray examining apparatus. A unique identification of an operator 6 is made by way of an identification system including an identification means 4 and a counterpart device 3. The counterpart device 3 is preferably integrated with the operating field 2. The identification means 4 in this case is a contacting card, which can be inserted into the counterpart device 3 that is shown as a card reader. The card reader 3 can read the contacting card 4, and in another advantageous embodiment, it can also write to the card. The identification means 4 here is preferably connected mechanically to the operator 6 by a chain-like connection 5.

When a contacting identification means 4 is introduced into the card reader 3, the operating system of the X-ray examining apparatus, which was previously in a non-activated state, i.e., in stand-by mode, is initiated. At the same time, for example, the operating field 2 may be cleared for operation of keys 2.1. Upon removal of identification means 4 from card reader 3, the operating system is deactivated and returns to stand-by mode. This may be accomplished automatically or by having the operator 6 log off manually. The operating system and thus the X-ray examining apparatus remain in ready mode only as long as the identification means 4 remains in the card reader 3.

Figure 2:
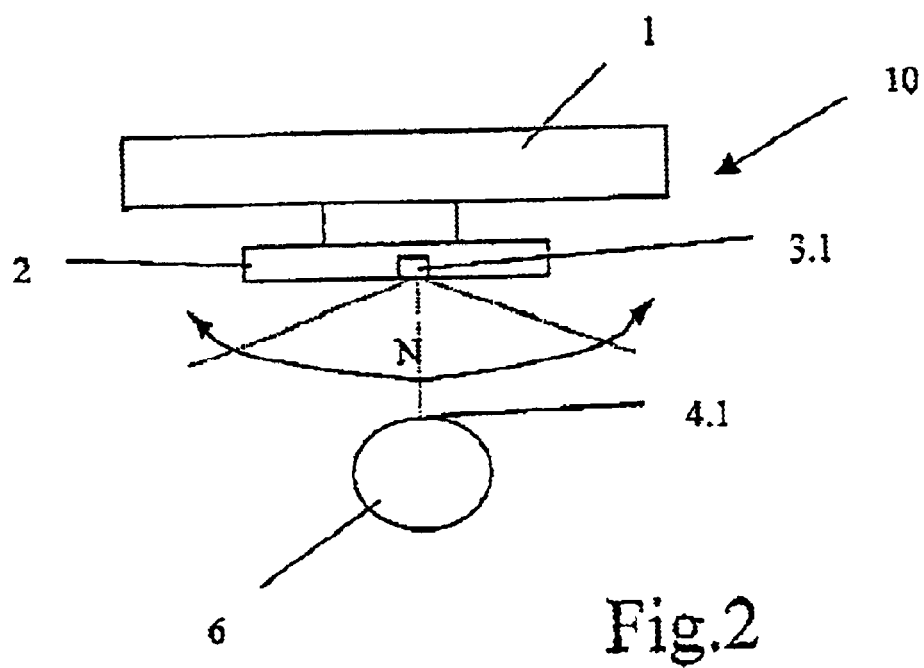
FIG. 2 an operative area of a smart card that functions without contact, shown in plan view.

FIG. 2 illustrates another variant of the present invention, where the identification system operates without contact, e.g., by wireless radio link or by infrared radiation. A counterpart device 3.1 here is connected electrically to a transceiver unit as an identification means 4.1, so the transceiver 4.1 can be read by and is preferably also writable by the counterpart device 3.1. The operating readiness of the operating system is guaranteed in a local area N that is defined in advance. When operator 6 leaves local area N, the operator 6 is automatically logged off.

However, it is also possible for an operator 6 to disconnect manually. To prevent an unintentional disconnect, a so-called time safety interval Δt may be incorporated, so that a shutdown takes place only after the interval has been exceeded. Such a protective circuit may also be incorporated into both embodiments.

In an advantageous manner, the operator 6 may also use the identification means 4, 4.1 to assign commands/functions predetermined individually by the operator 6 to freely allocable keys 2.1. Thus, the operator 6 is given an opportunity to independently adjust frequently used functions, such as switching from a color display to a gray scale display, or changing the operational characteristics of the system for use by a left-handed operator. This allocation of functions to keys 2.1 takes place automatically when identification means 4 or 4.1 logs on to the operating system. However, the identification device could also be programmed with authorizations for the operating system of the X-ray examining apparatus. Instrument settings such as the monitor height or the seat position of an ergonomic operator terminal can also be stored in the identification means 4, 4.1. In addition, identification means 4, 4.1 can also be used as an access card for certain installations or areas of a company.

It is self-evident that modifications are also possible within the scope of the present invention. For example, the counterpart device 3, 3.1 of the identification system may also be installed physically in the X-ray examining apparatus.

To prevent unauthorized operators from using an external identification means 4, 4.1, additional security measures may also be provided, including in addition to a secret PIN, identification by means of a so-called live scanner (fingerprinter) 20 or a similar device, as indicated in FIG. 1.

What is claimed is:

1. An X-ray examining apparatus comprising:
   a monitor for displaying an X-ray image for an operator; and
   an operator unit, said operator unit comprising:
      an operating field for being manipulated by the operator to operate the operating unit and thereby operate the X-ray examining apparatus and the monitor; and
      an identification system, said identification system including an identification means for being carried by the operator and a counterpart device for being operatively coupled to said operating field,
      wherein said counterpart device is for activating said operating unit to a first mode of operation when the operator begins to operate the operating unit in at least partial response to information on said identification means read by said counterpart device, and for activating said operating unit to a second different mode of operation in at least partial response to information on said identification means read by said counterpart device when said operator stops operating said X-ray examining apparatus
   wherein said X-ray examining apparatus inspects baggage.

2. The X-ray examining apparatus according to claim 1, wherein the counterpart device is a card reader and said identification means is a card, said card reader and said card being structured such that said card reader can read said card with the card remaining attached to said operator.

3. The X-ray examining apparatus according to claim 1, wherein the identification means is a contacting identification device that can remain attached to said operator when said identification means is in a predetermined space, so that said identification means is automatically moved from said predetermined space when said operator leaves said operating field.

4. The X-ray examining apparatus according to claim 3, wherein the contacting identification device is one of a chip card and a magnetic card.

5. The X-ray examining apparatus according to claim 1, wherein the identification device is an identification device which operates without contact and can remain attached to said operator when said identification means is in said predetermined space, whereby said identification means is automatically moved from said predetermined space when said operator leaves said operating field.

6. The X-ray examining apparatus according to claim 5, wherein the identification device is one of a transceiver unit and a transponder which works together with the counterpart device of the identification system without contact.

7. The X-ray examining apparatus according to claim 5, wherein a non-contact link between the identification device and the counterpart device is maintained within a local area proximate to said operating field.

8. The X-ray examining apparatus according to claim 1, wherein the counterpart device has a respective one of a read and write mode by means of which the identification device is respectively one of read from and written on with respective installation- and person-specific data.

9. The X-ray examining apparatus according to claim 8, wherein there is a read mode by means of which the identification device is read from, and wherein read data is recorded in various X-ray apparatus and is caused to be combined and stored centrally by the identification device.

10. The X-ray examining apparatus according to claim 1, wherein the counterpart device is integrated into the operating field.

11. The X-ray examining apparatus according to claim 1, wherein an individual operator-unit setting is accomplished by means of the identification means, whereby the identification means of a first operator activates the operating unit to a different first mode of operation than would the identification means of the second operator.

12. The X-ray examining apparatus according to claim 1, wherein the operator unit is cleared by the identification device upon the operator unit entering the second different mode of operation upon the operator moving the identification means away from the predetermined space.

13. The X-ray examining apparatus according to claim 1, wherein a live scanner is also connected upstream from the identification system.

14. The X-ray examining apparatus as in claim 1, wherein said counterpart device is for activating said operating unit to said first mode of operation in at least partial response to said operator carrying said identification means moving said identification means within a predetermined space relative to said counterpart device at which said operator carrying said identification means can manipulate said operating field and for activating said operating unit to said second different mode of operation in at least partial response to said operator moving said identification means away from said predetermined space.

15. The X-ray examining apparatus as in claim 14, wherein said identification means is for automatically activating said operating unit to said second different mode of operation in response to said operator moving said identification means away from said predetermined space.

16. An X-ray examining apparatus comprising:
   at least one radiation source;
   at least one radiation detector;
   a display unit; and
   an operator unit including an identification system, said operator unit being placed into either a first mode or second mode of operation depending upon an input from said identification system for controlling said X-ray examining apparatus,
   wherein said identification system detects a user-specific identification device within a predetermined area, such that upon detection of said user-specific identification device said operator unit is placed into the first mode of operation via said input, and upon non-detection of said user-specific identification device in said predetermined area, said operator unit is placed into the second mode of operation via said input
   wherein said X-ray examining apparatus inspects baggage.

17. The X-ray examining apparatus according to claim 16, wherein said predetermined area defines an area extending beyond said identification system and encompasses at least said control unit.

18. The X-ray examining apparatus according to claim 16, wherein said second mode of operation is a stand-by mode of operation.

19. The X-ray examining apparatus according to claim 16, wherein said second mode of operation deactivates the X-ray examining apparatus.

20. The X-ray examining apparatus according to claim 16, wherein the user-specific identification device includes individualized instrument parameters for each user.

21. The X-ray examining apparatus according to claim 16, wherein data provided by the identification system, which relates to said user-specific identification device, is stored.

22. A method for controlling an X-ray examining apparatus having a radiation source, a detector, a display unit and a operator unit, said method comprising:
   detecting a user-specific identification device in a predetermined area;
   selecting a mode of operation based on the detection of said user-specific identification device, wherein said mode of operation controls said X-ray examining apparatus
   wherein said X-ray examining apparatus inspects baggage.

* * * * *